No. 761,373. PATENTED MAY 31, 1904.
L. P. GRAHAM.
SEED CORN SORTER.
APPLICATION FILED NOV. 16, 1903.
NO MODEL. 2 SHEETS—SHEET 2.
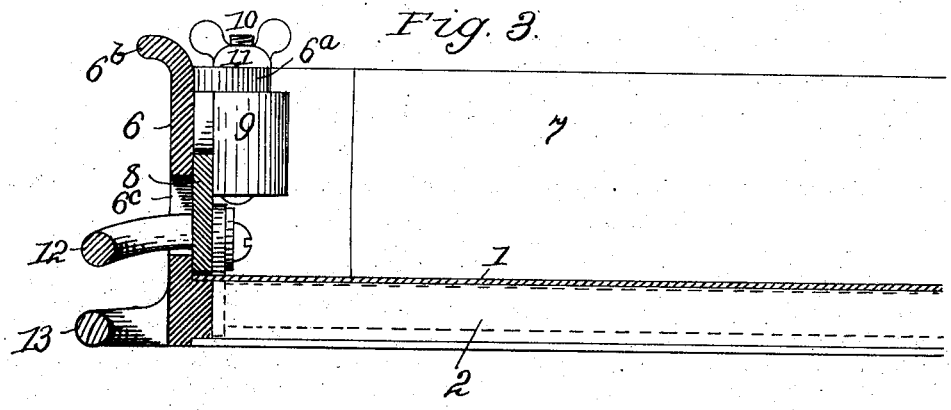
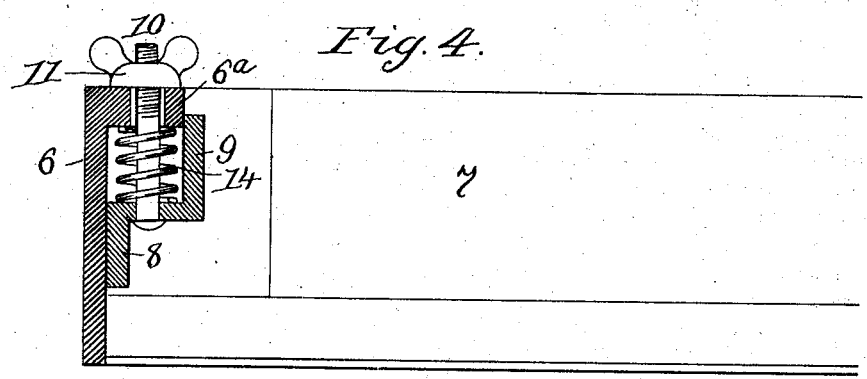
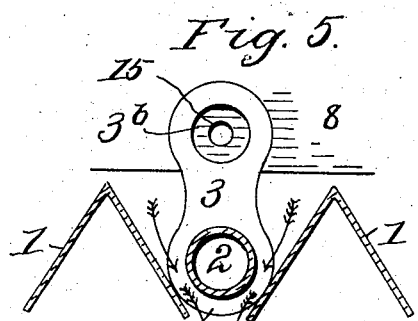
Witnesses
Fay Graham
Nora Graham
Inventor
Levi P. Graham No. 761,373.

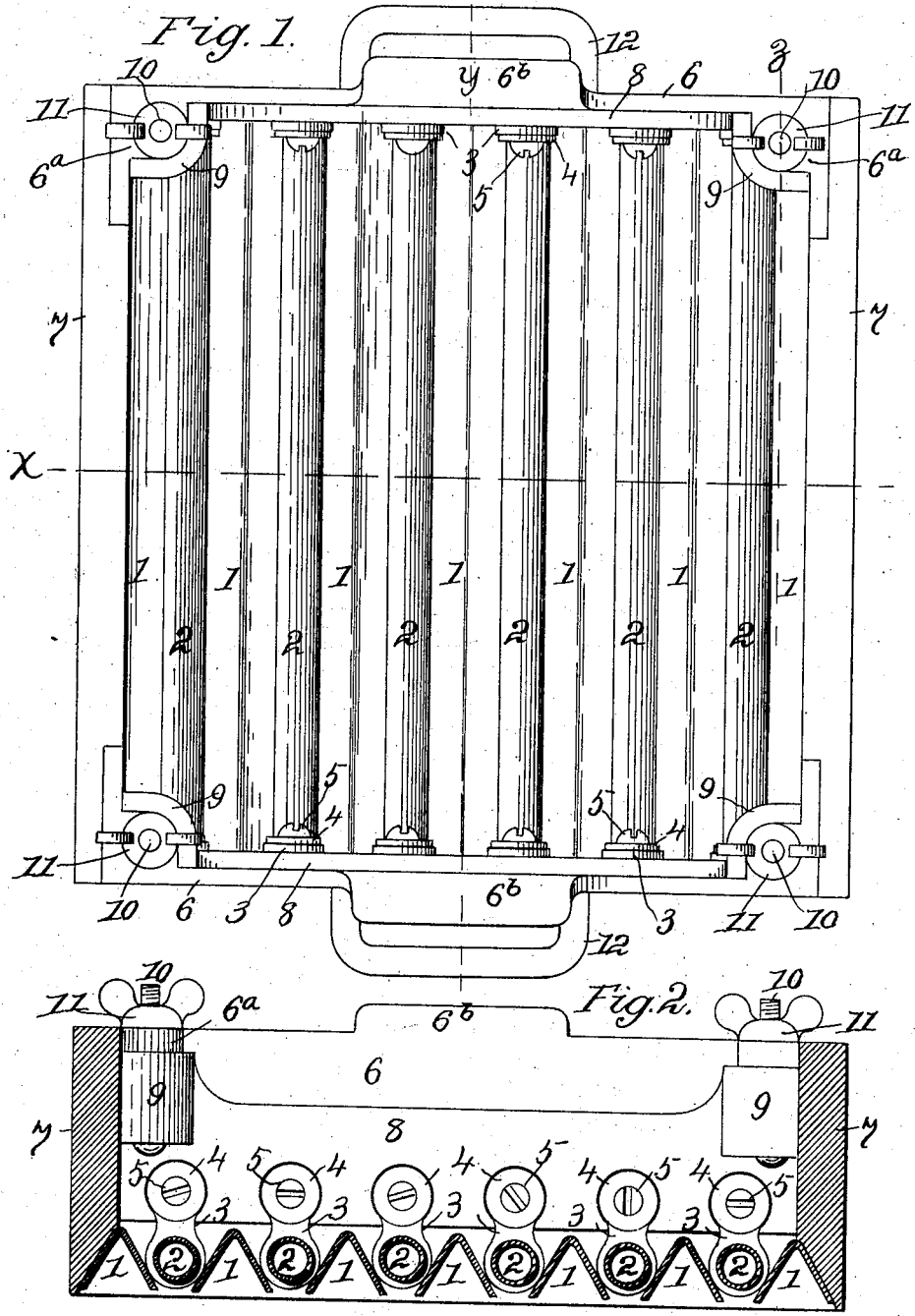

Patented May 31, 1904.

UNITED STATES PATENT OFFICE.

LEVI P. GRAHAM, OF DECATUR, ILLINOIS.

SEED-CORN SORTER.

SPECIFICATION forming part of Letters Patent No. 761,373, dated May 31, 1904.

Application filed November 16, 1903. Serial No. 181,415. (No model.)

*To all whom it may concern:*

Be it known that I, LEVI P. GRAHAM, of the city of Decatur, county of Macon, and State of Illinois, have invented a certain new and useful Seed-Corn Sorter, of which the following is a specification.

This invention provides a hand-sifter by means of which corn may be sorted preparatory to planting.

The invention is exemplified in the structure hereinafter described, and it is defined in the appended claims.

In the drawings forming part of this specification, Figure 1 is a plan of an embodiment of my invention. Fig. 2 is a section on line X in Fig. 1. Fig. 3 is a section on line Y in Fig. 1. Fig. 4 is a section on line Z in Fig. 1, and Fig. 5 is a diagram showing in cross-section certain details of the sorter.

The corn is sorted through a plurality of slots to which the grains are presented edgewise, and the slots are formed by a plurality of separate parallel strips triangular in cross-section and a set of bars or rods held above and between the triangular strips out of contact therewith. The apexes of the triangular strips 1 are presented upward. The rods 2 are preferably circular in cross-section, although not necessarily so, and the rods are adjustable vertically with relation to the strips to vary the width of the slots. The triangular strips are fastened at their ends to the lower edges of the end walls 6 of the box 7, and the rods are secured to plates 8 inside the box. At the corners of the box horizontal plates $6^a$ project inward from the upper edges of the end walls of the box, and the plate 8 has housings 9, which fit around the horizontal plates $6^a$. Bolts 10 extend through the housings 9 and the plates $6^a$, and wing-nuts 11 are screwed onto the upward-projecting ends of the bolts. Springs 14 (shown in Fig. 4) are preferably placed in the housings 9 between the bottoms of the housings and the plates $6^a$, and they aid gravity in holding the rods in their nearest approach to the strips. The nearness of the rods to the strips is varied by adjusting the nuts 11, and the width of the several slots is thereby made to suit different sizes of corn.

The rods 2 may be secured to the plates 8 in different ways; but I prefer to use the hangers 3. (Shown in detail in Fig. 5 of the drawings.) These hangers are bored each at one end to fit snugly over an end of a rod 2, and the part $3^a$ of the hanger encircling the lower half of the rod is annular and of a uniform width equal to the nearest approach of the rods to the strips. The upper end of the hanger has a bore $3^b$ of considerable diameter, and a set-screw 5 of less diameter than the bore $3^b$ extends through each hanger and into a threaded hole 15 in plate 8. A washer 4 is interposed between the head of each set-screw and the upper end of a hanger, and the washers are large enough to more than cover the bores $3^b$.

In assembling the parts the strips 1 are secured in place as accurately as is practical in work of this nature, and the plates 8 are set in their lowest positions. A hanger 3 is then slipped over each end of each rod 2, the rods are laid in the troughs formed by the inclined sides of the triangular strips, the upper ends of the hangers are swung into vertical or approximately vertical positions with their bores alining as nearly as they will with the screw-holes 15, and the set-screws and washers are used to clamp the hangers securely in place. By this mode of operation considerable inaccuracy may exist in the arrangement of the triangular strips without affecting accuracy of adjustment of the slots, as the rods take their original positions from the sides of the strips with which they coact, and after they are properly placed they may be adjusted together toward and from the strips with nice accuracy.

In operating the sorter corn is supplied to the box, the box is agitated in the usual manner, grains of desired thickness pass edgewise through the slots, and the remaining grains are afterward thrown out of the box separate from the desirable corn.

At times grains slightly too thick to pass through the slots will wedge therein so tightly that their removal is difficult, and to provide against this contingency I have slotted end walls 6, as shown at $6^c$ in Fig. 3, have attached handles 12 to plates 8 and extended them through the slots, and have formed bearings $6^b$ for the palms of the operator on the upper edges of box-walls 6. The box is held by handles 13, one of which is shown in Fig. 3, while the corn is sorted; but when it is desired to dislodge wedged grains the fingers of the operator grasp handles 12, the palms of his hands press against bearings $6^b$, and by a hand-closing motion the rods are temporarily forced away from the strips and the wedged grains are permitted to escape. As soon as the hand-pressure is relieved gravity and the springs, or gravity alone, will return the rods to their operative correlation with the strips, and the sorting may proceed.

The inclined sides of strips 1 tend to arrange the grains of corn edgewise and to guide them downward to the slots formed by the spaces between the strips and the rods. The rods are placed above the lower edges of the strips and between the inclines formed by the plane or approximately plane surfaces of the strips. Each rod is extended lengthwise through a trough formed of a pair of strips, and the greatest diameter of the rod is considerably below the upper edges or apexes of the strips.

I claim—

1. In a corn-sorter, the combination of a sifter-box, a bottom for the box formed of a plurality of parallel, separate strips having plane inclined sides, and a set of rods placed one in each trough formed by the strips, substantially as described.

2. In a corn-sorter, the combination of a sifter-box, a bottom for the box formed of a plurality of parallel, separate strips having plane inclined sides, rods between the inclined sides of the strips, and means for adjusting the rods toward and from the strips, substantially as described.

3. In a corn-sorter, the combination of a sifter-box, a bottom for the box formed of a set of parallel, separate strips having plane inclined sides, plates vertically adjustable in the ends of the box, and a set of rods secured to the plates between the inclined sides of the strips, substantially as described.

4. In a corn-sorter, the combination of a sifter-box, a bottom for the box formed of a set of parallel, separate strips having inclined sides, plates vertically adjustable in the ends of the box, springs pressing downward on the plates, and a set of rods secured to the plates above and between the strips, substantially as described.

5. In a corn-sorter, the combination of a sifter-box, a bottom for the box formed of a set of parallel, separate strips having inclined sides, plates vertically adjustable in the ends of the box, springs pressing downward on the plates, screws to raise the plates, and a set of rods secured to the plates above and between the strips, substantially as described.

6. In a corn-sorter, the combination of a sifter-box, a bottom for the box formed of a set of parallel, separate strips having inclined sides, plates vertically adjustable in the ends of the box, and rods above and between the strips, each connected independently and adjustably with the plate, substantially as described.

7. In a corn-sorter, the combination of a sifter-box, a bottom for the box formed of a set of parallel, separate strips having inclined sides, adjustable plates in the ends of the box, rods secured to the adjustable plates above and between the strips, springs tending to hold the plates depressed, set-screws for adjusting the plates against pressure of the springs and handles on the plates for raising the rods temporarily away from the strips, substantially as and for the purpose described.

In testimony whereof I sign my name in the presence of two subscribing witnesses.

LEVI P. GRAHAM.

Witnesses:
FAY GRAHAM,
NORA GRAHAM.